United States Patent [19]
Arakawa et al.

[11] Patent Number: 5,464,339
[45] Date of Patent: Nov. 7, 1995

[54] MOLDING DYE FOR DISK SUBSTRATE

[75] Inventors: Nobuyuki Arakawa; Takashi Segawa, both of Kanagawa; Moriyoshi Kaneko, Tokyo; Kazuki Miyairi; Kazutoshi Takayama, both of Nagano, all of Japan

[73] Assignees: Sony Corporation, Tokyo; Nissei Plastic Industrial Co., Ltd., Nagano, Japan

[21] Appl. No.: 271,669

[22] Filed: Jul. 7, 1994

[30] Foreign Application Priority Data

Jul. 12, 1993 [JP] Japan ..................... 5-171393

[51] Int. Cl.$^6$ ................................. B29C 33/30
[52] U.S. Cl. ................... 425/186; 425/192 R:193; 425/542; 425/810; 264/107
[58] Field of Search .................... 425/186, 192 R, 425/810, DIG. 29, 193, 190, 194, 542; 264/107

[56] References Cited

U.S. PATENT DOCUMENTS

| | | | |
|---|---|---|---|
| 4,527,971 | 7/1985 | Strausfeld et al. | 425/810 |
| 4,789,320 | 12/1988 | Sasamura et al. | 425/190 |
| 4,790,738 | 12/1988 | Shimojo et al. | 425/192 R |
| 5,308,235 | 5/1994 | Kamitakahara et al. | 425/810 |

*Primary Examiner*—Khanh P. Nguyen
*Attorney, Agent, or Firm*—Ronald P. Kananen

[57] ABSTRACT

A disk substrate molding die is provided in which the quantity of eccentricity of a stamper can be reduced to a small value. The molding die includes a member having mounted thereon a thin plate (19) carrying thereon a recorded transfer signal and an adjusting device consisting of a plurality of pairs of adjusting blocks, each formed of movable blocks (9a) and (9b) and blocks (10a) and (10b) having adjacent surfaces inclined in the moving direction of the movable blocks and common to one another.

16 Claims, 7 Drawing Sheets

MOLDING DYE FOR DISK SUBSTRATE

BACKGROUND OF THE INVENTION

The present invention generally relates to a molding die and, more particularly, is directed to a molding die for a disk substrate suitable for molding, for example., an optical disk, a magnetic disk, and the like.

Generally, an optical disk, a magnetic disk or the like, as seen in FIG. 1, made of synthetic resin is formed through injection molding with a die to which a thin metal plate called a stamper, carrying a signal concentrically or spirally recorded thereon, is fixed.

The eccentric accuracy of a disk, that is, the accuracy against the eccentricity of a disk, is determined on the basis of the synergism of three factors such as variations in accuracy in punching of a stamper center hole, backlash between the stamper and a stamper mounting holder, and backlash between the stamper holder and a body of the die. Accordingly, the eccentric accuracy is improved by reducing the variations and backlash of the three factors so that various disk standards are satisfied. For example, the eccentric accuracy allowable for the disk standards is, for example, ±70 µm for a compact disk (CD), and ±50 µm for a mini disk (MD).

As methods for manufacturing duplicate disks from plastic material, in addition to the aforesaid method using a stamper carrying a signal recorded thereon, there is known, for example, a method in which a signal is recorded directly on a die. This method, however, has a defect that it is difficult to cope with a change in the contents of software or exchange of software per se, and even if it is made possible to cope with such problems, the cost is increased correspondingly.

This is applied to the case where decomposition gas is generated from plastic material or the like or dirt/injury is generated in handling. Accordingly, the method of using a stamper is employed. In this case, however, there arises a problem that it is impossible to suppress the eccentric accuracy, for example, within 20 µm in all cases.

SUMMARY OF THE INVENTION

It is an object of the present invention to provide an improved disk substrate molding die in which the aforesaid shortcomings and disadvantages encountered with the aforesaid related art can be eliminated.

More specifically, it is an object of the invention to provide a disk substrate molding die in which an amount of eccentricity of a stamper can be adjusted so as to be reduced.

According to an aspect of the present invention, a disk substrate molding die is comprised of a mount unit for mounting a thin plate carrying a transfer signal recorded thereon, and an adjustment unit for moving the thin plate in its plane direction.

Also, according to another aspect of the present invention, the disk substrate molding die has the adjustment unit which includes a plurality of pairs of position adjusting blocks each of which is formed of a movable block having an adjacent surface inclined in the moving direction of the movable block and common to each other. In a disk obtained by the disk substrate molding die according to the present invention, it is possible to suppress the quantity of eccentricity within 20 µm.

The preceding and other objects, features, and advantages of the present invention will become apparent from the following detailed description of illustrative embodiments thereof when read in conjunction with the accompanying drawings, in which like reference numerals are used to identify the same or similar parts in the several views.

DESCRIPTION OF THE PREFERRED EMBODIMENTS

An embodiment of the molding die for a disk substrate according to the present invention will now be described below with reference to FIGS. 2 to 6B.

Figure 2:
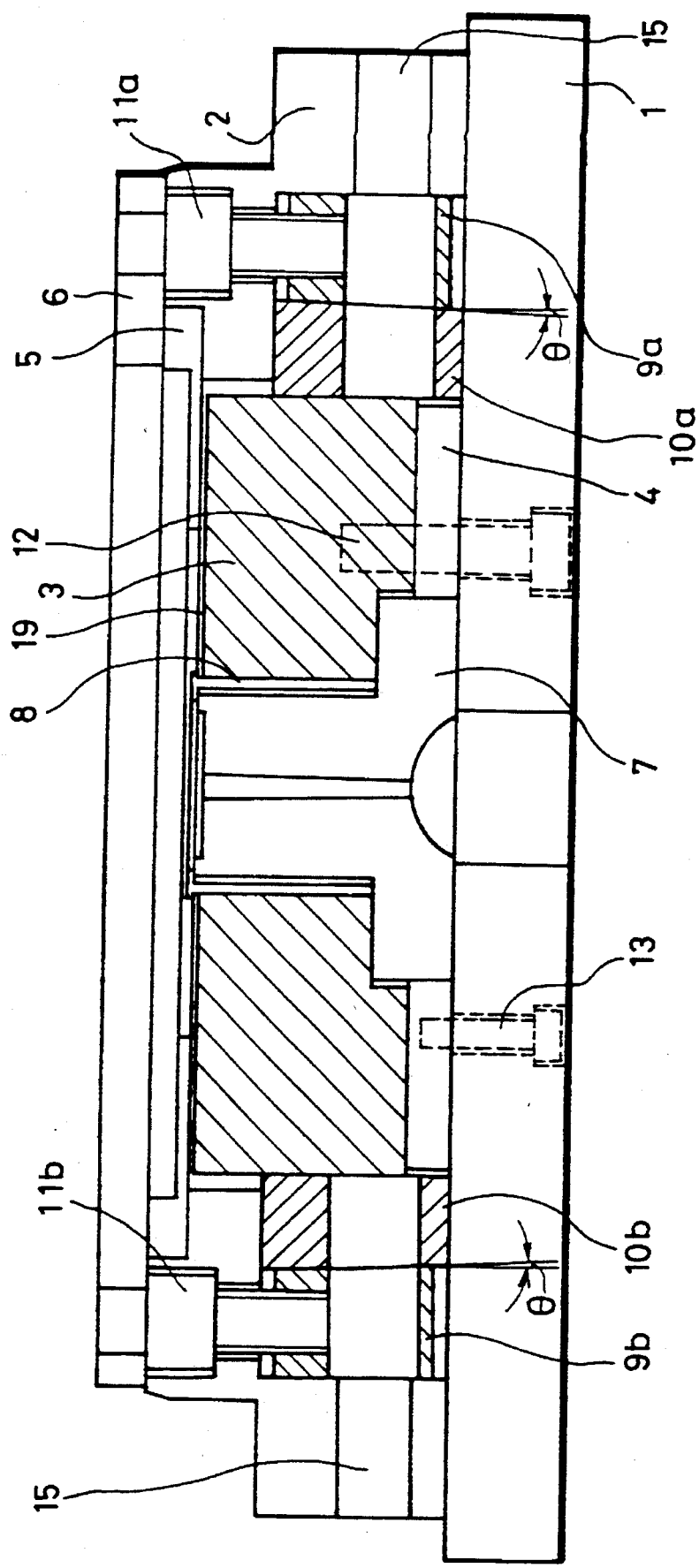
FIG. 2 is a schematic sectional view, taken along a line II—II in FIG. 3, showing an embodiment of a disk substrate molding die according to the present invention.

In FIG. 2, the reference numeral 3 designates a mirror block by which a stampers 19 is fixed. The reference numerals 10a and 10b designate a pair of position adjusting blocks which are in close contact with the mirror block 3 so as to fix the mirror block 3. Another pair of position adjusting blocks, in addition to the aforementioned pair of position adjusting blocks 10a and 10b, are further provided so as to cooperate together with the aforementioned pair of position adjusting blocks 10a and 10b to fix the mirror 3 in X- and Y-directions.

On the respective outer sides of the position adjusting blocks 10a and 10b, a pair of position adjusting blocks 9a and 9b are provided so as to fix the position adjusting blocks 10a and 10b. Another pair of position adjusting blocks, in addition to the aforementioned pair of position adjusting blocks 9a and 9b are further provided so as to cooperate together with the aforementioned pair of position adjusting blocks 9a and 9b to fix the aforesaid two pairs of the inside position adjusting blocks 10a, 10b in X- and Y-directions.

In FIG. 2, the molding die structure includes a fixed side mounting plate 1, a fixed side embracement plate mounted thereon, a mirror block spacer 4, a holder 5 for holding the stamper 19 at its outer periphery, a spool bush 7, a holder 8 for holding the stamper at its inner periphery, a fixing bolt 13 and a dial display insertion bore 15, respectively.

In this embodiment, a molding die having the die structure shown in FIG. 2 is used as a molding die for a disk substrate.

Figure 1:
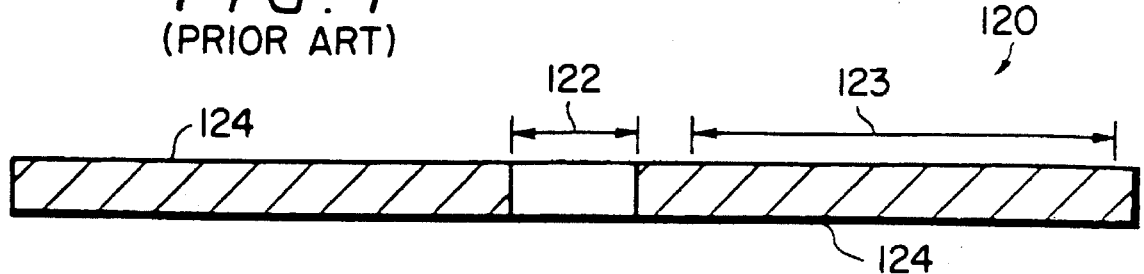
FIG. 1 is a schematic sectional view generally showing the structure of an optical or magnetic disk.
Figure 6A:
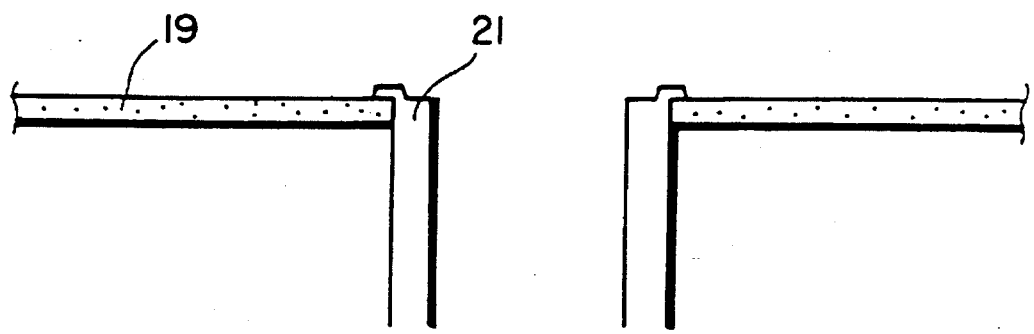
FIGS. 6A and 6B are schematic sectional views respectively showing examples of a stamper supported in the disk substrate molding die according to the present invention.
Figure 6B:
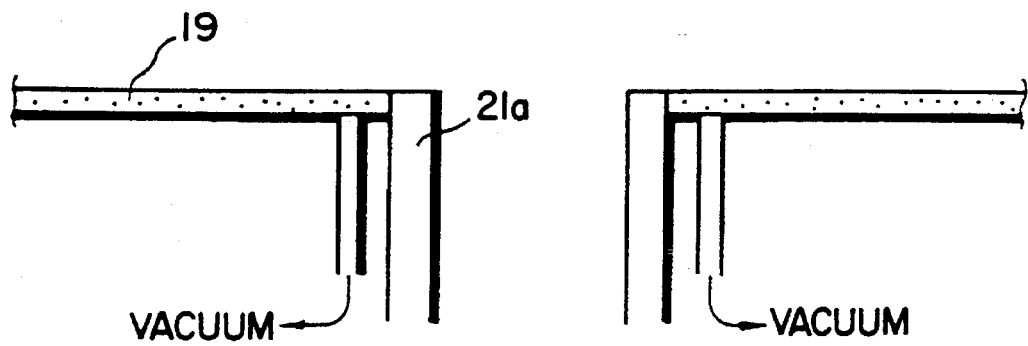

By using the molding die, such a disk 120 as shown in FIG. 1 can be obtained in which a signal surface 123 to which a signal has been transferred is formed on either one or both of its opposite surfaces 124 and a center hole 122 is bored therethrough at its center portion.

Figure 4:
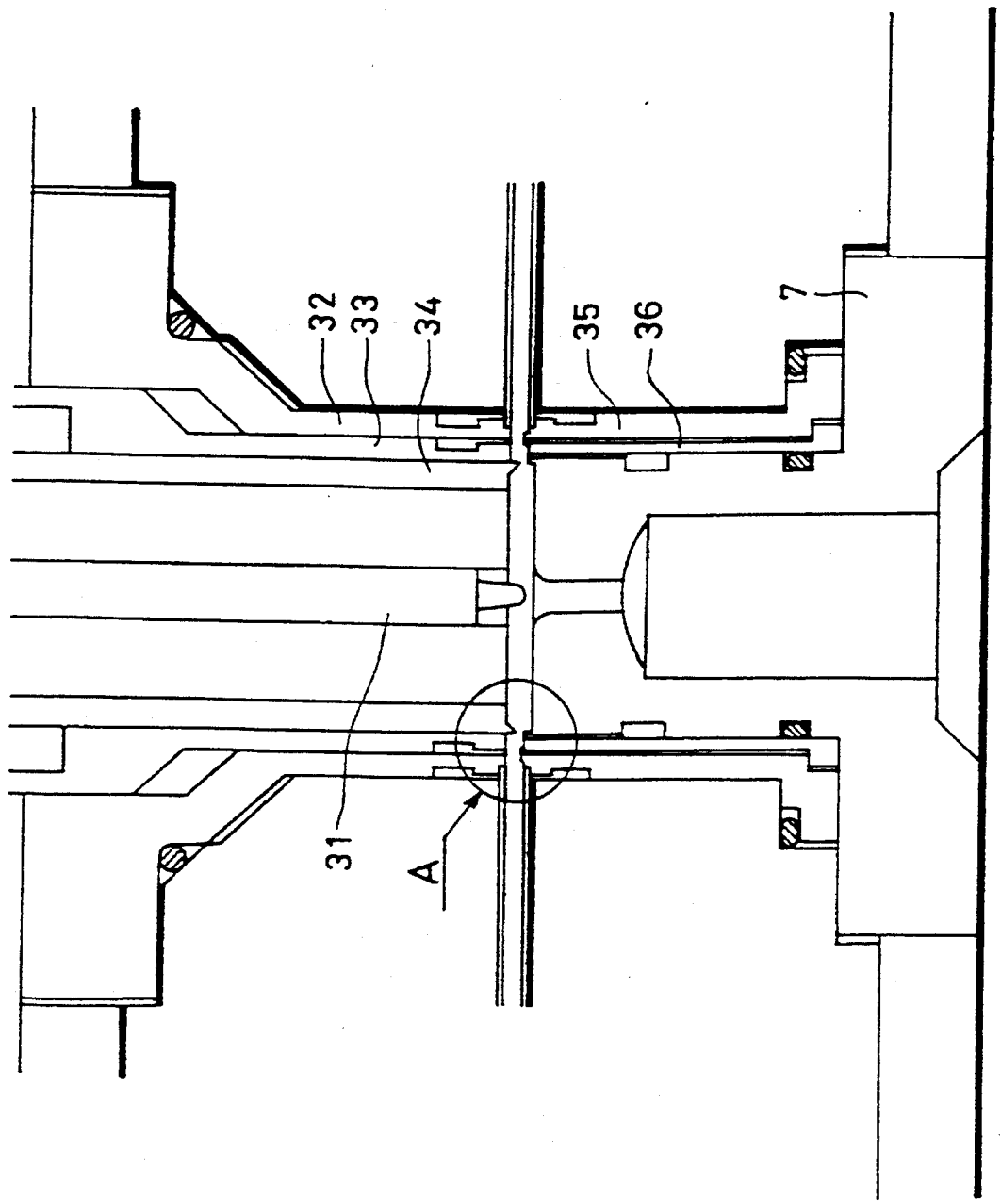
FIG. 4 is a schematic sectional view showing an operating portion of the disk substrate molding die according to the present invention.

The center hole 122 is set in a stamper holder 21 (see FIG. 6A) or a guide 21a (see FIG. 6B) in the die in such a condition that the center hole 122 is punched with a small eccentricity state relative to the stamper signal area. As shown in FIG. 4 illustrating a view of an operating portion of the molding die, in the inside of the stamper holder 21 or the guide 21a, mechanisms such as a gate cutter 34 (disk center hole), a ejector sleeve 33 (for separating a disk mechanically), an ejector and so on are formed as the die structure.

Figure 3:
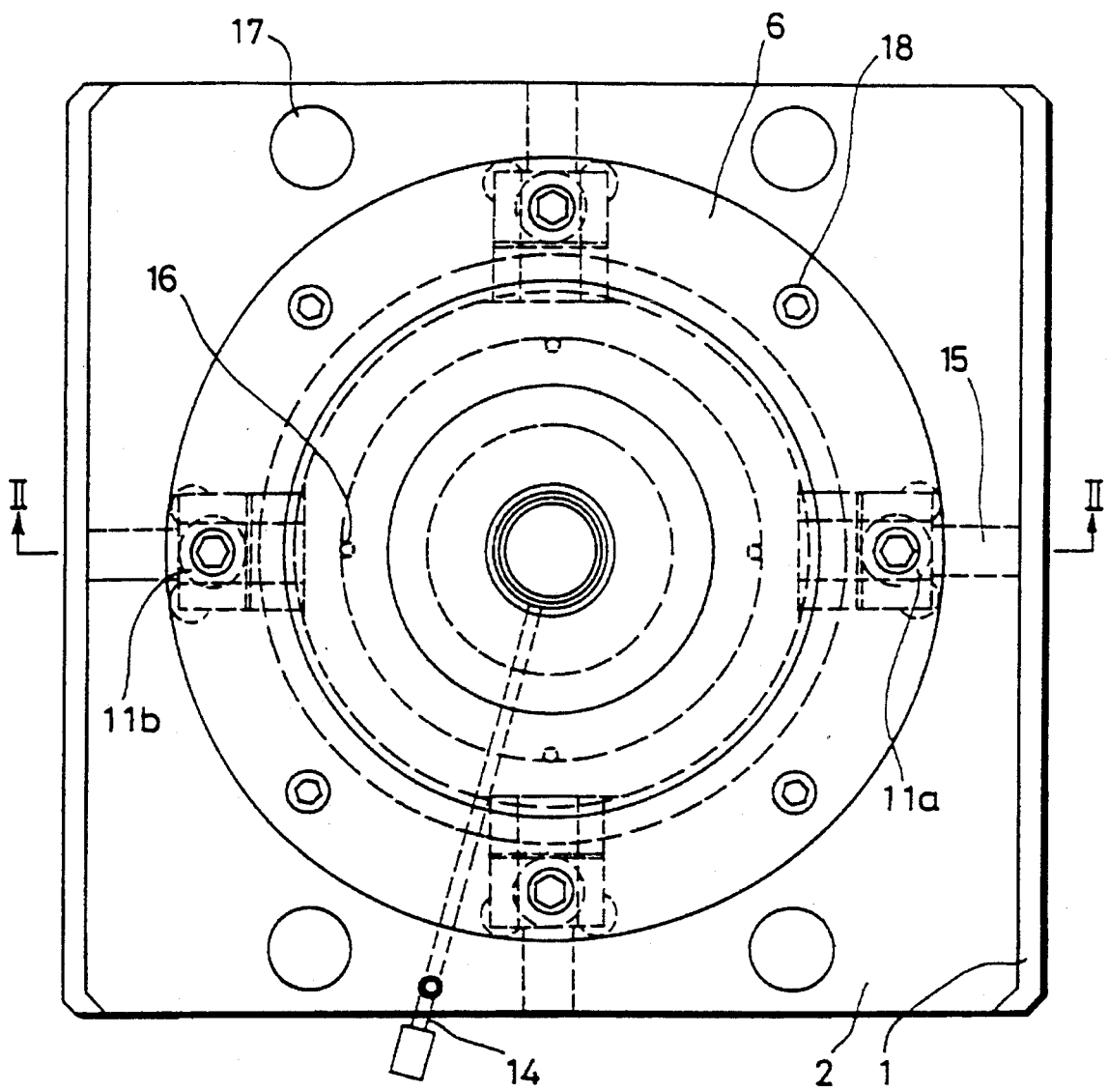
FIG. 3 is a schematic plan view showing the embodiment of the disk substrate molding die according to the present invention.

FIG. 3 is a schematic plan view showing the disk substrate molding die according to the embodiment shown in FIG. 2. In FIG. 3, the reference numeral 14 designates a fixing pin for the inner-periphery holder 8. A rotation position determining pin 16, a guide hole 17 and a fixing bolt 18. Further, in FIG. 4, the reference numeral 31 designates an ejector pin, with a moving side pilot 32, a center holder 35 and a bush 36 for the center holder 35.

As described above, disk eccentricity accuracy is determined on the basis of the synergism of the following three factors: (1) variations in accuracy in punching the stamper center hole; (2) backlash between the stamper and the stamper mounting holder; and (3) backlash between the stamper holder and a body of the die.

Figure 5:
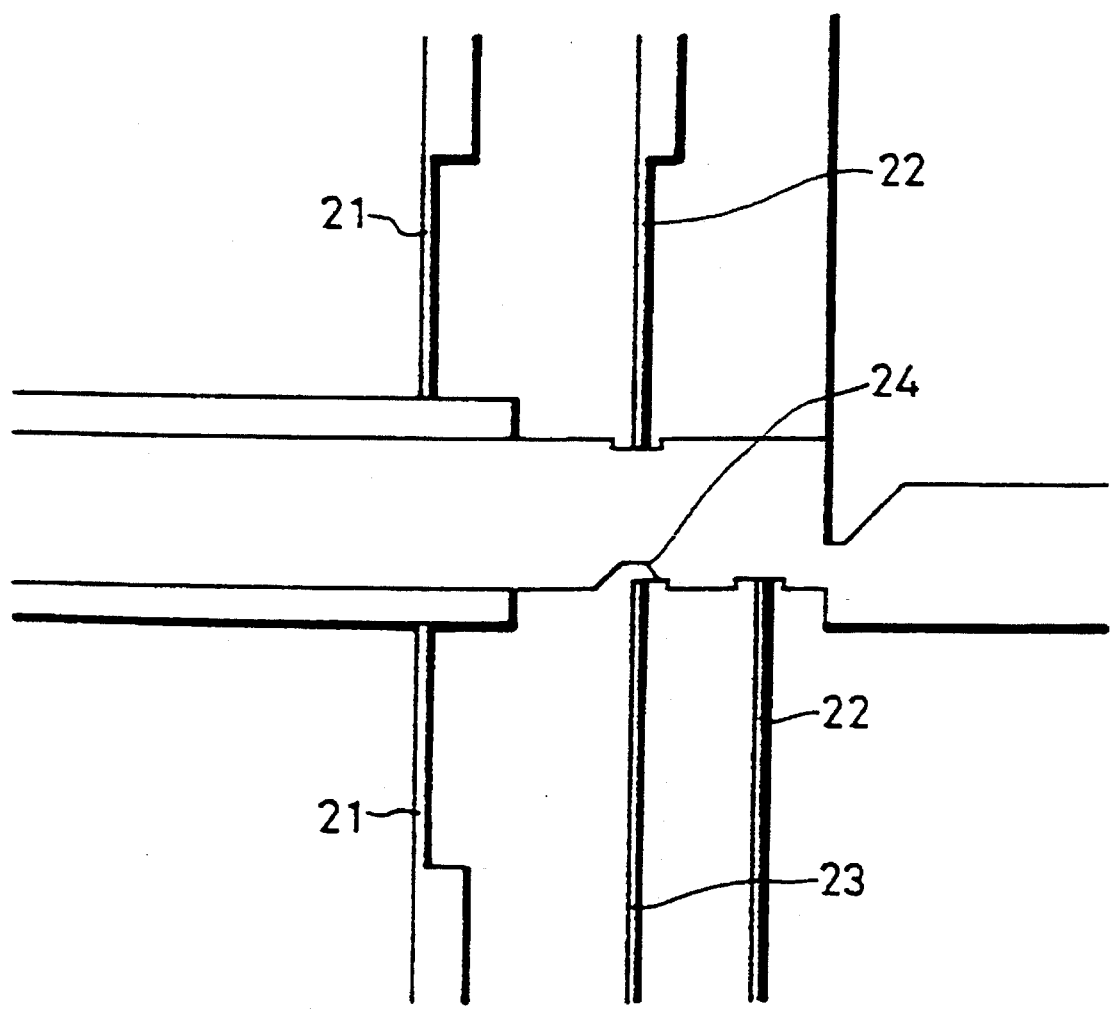
FIG. 5 is a schematic sectional view showing in an enlarged scale a portion A of the disk substrate molding die shown in FIG. 4.

If one side of the die, for example, the fixed side of the die, is adjusted in the horizontal direction and then the stamper is operated in X- and Y-directions in order to bring the eccentric accuracy into allowable range, it will be clear from FIGS. 4 and 5 that there occurs a case where a punch bites the die. In FIG. 5, the reference numeral 21 designates a stamper vacuum attracting member, 22 an air blower member and a clearance 23 for adjustment in X- and Y-directions, respectively.

This embodiment has such a feature that the stamper position adjusting blocks 9a, 9b, 10a and 10b with an inclination or taper by a certain angle as shown in FIG. 2 are provided and then the position of the stamper 19 with the mirror block 3 is moved in the X-and Y-directions by a value corresponding to the taper angle θ by adjusting the position adjusting blocks 9a and 9b by means of position adjusting block bolts 11a and 11b.

In this structure, the angle θ is equal to or less than 10°. For example, in the case of θ=2°, the maximum adjustment value is 0.07 mm, and, for example, in the case of θ=5°, the maximum adjustment value is 0.17 mm.

In order to move the stamper without biting between the punch and the die, it is necessary to provide a mechanism therefor at the portion from the gate cutter or punch portion to the stamper holder. Further, in order to move the stamper position, a hollow or clearance therefor must be provided. Therefore, by the provision of such a structure in the form of a cover 24 as shown in FIG. 5 which is an enlarged and detailed view of the portion A in FIG. 4, the state where burr or entrance of resin by pressure at the time of injection molding disables the stamper position from moving can be avoided.

Referring to FIG. 2, a method of adjusting the X- and Y-positions of the fixed-side mirror block 3 will be described below. Let a case now be assumed where the mirror block 3 is to be moved in the left side direction in FIG. 2.

First, a fixing bolt 12 by which the mirror block 3 is fixed is loosened from the back of the fixed side mounting plate 1.

Next, if the position adjusting bolt 11b is loosened, the position adjusting block 9b moves down in the drawing. Since the position adjusting bolt 11b is nipped at its head portion by a product thickness adjusting spacer 6, the position adjusting block 9b moves up and down if the position adjusting bolt 11b is rotated. Gaps are thus generated between the position adjusting block 10b and the position adjusting block 9b and hence between the position adjusting block 10b and the mirror block 3.

If the position adjusting bolt 11a is tightened, the position adjusting block 9a is lifted up, so that the position adjusting block 10a moves the mirror block 3 in the left side direction in FIG. 2 by the amount of the gaps generated by the aforementioned operation.

After the quantity of the movement thereof is confirmed by means of a dial depth meter which is inserted through the dial depth meter insertion 15, the two position adjusting bolts 11a and 11b are further tightened. Then, the fixing bolt 12 for fixing the mirror block 3 is tightened from the back of the fixed side mounting plate 1. This adjustment is performed both in the X-direction and in the Y-direction separately.

Figure 7:
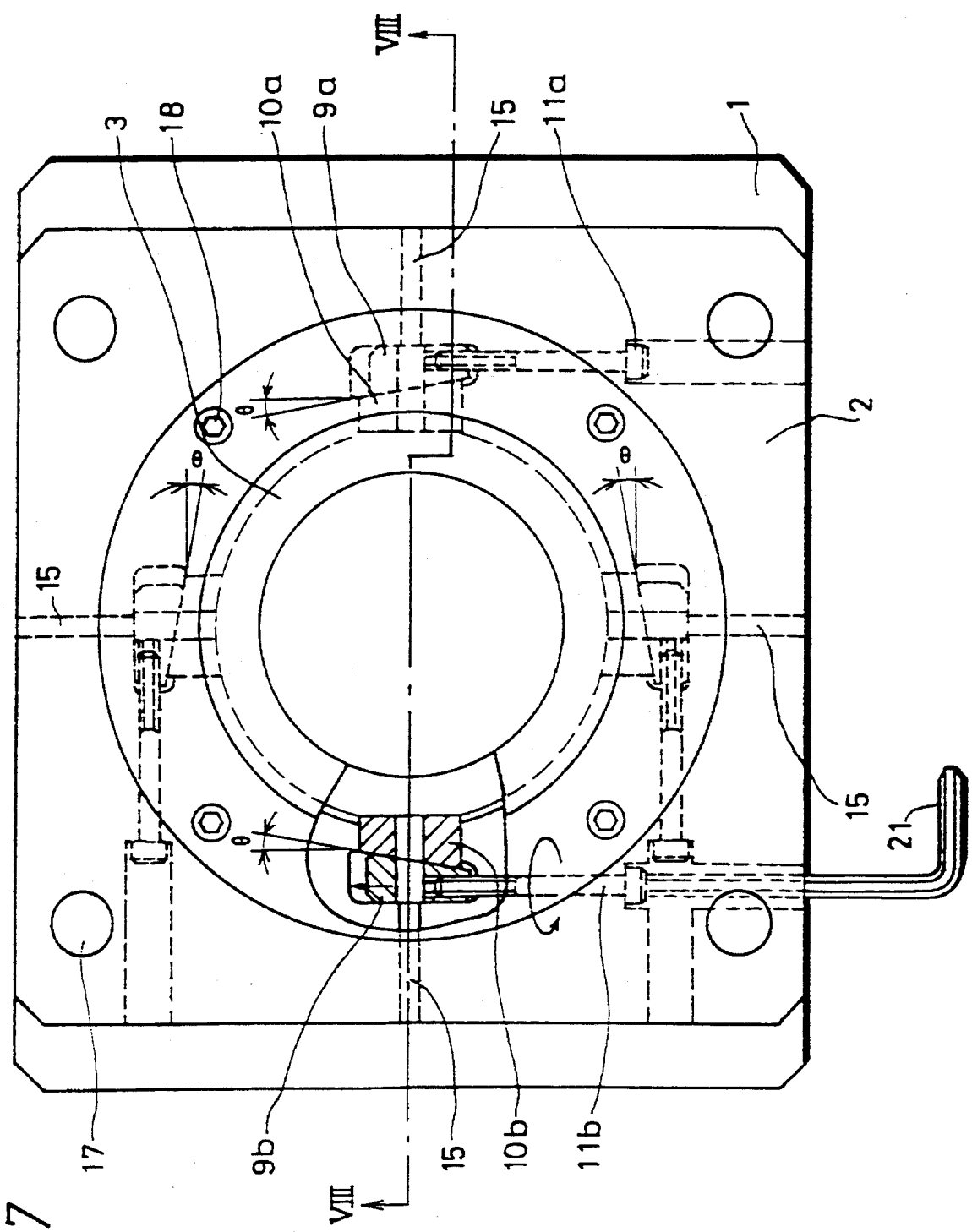
FIG. 7 is a schematic plan view showing another embodiment of the a disk substrate molding die according to the present invention.
Figure 8:
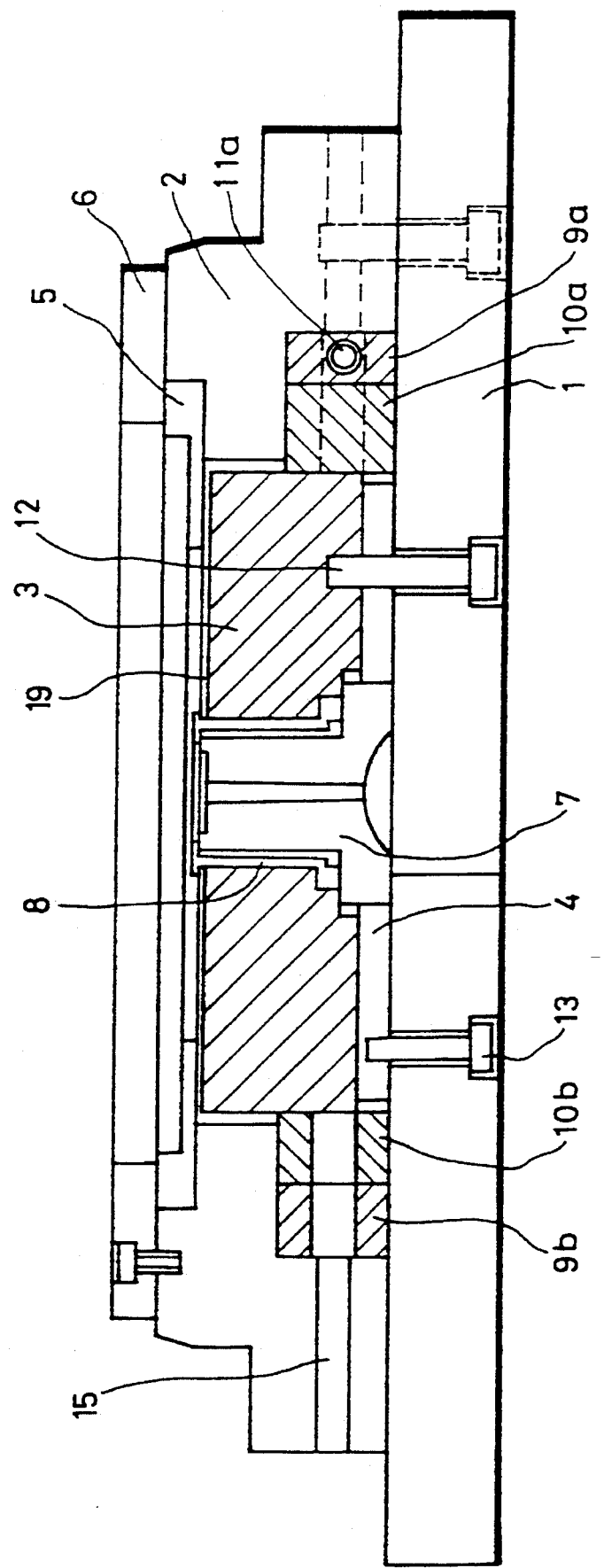
FIG. 8 is a schematic sectional view, taken along a line VIII—VIII in FIG. 7, showing another embodiment of the disk substrate molding die according to the present invention.

Another embodiment of the molding die for a disk substrate according to the present invention will be described below with reference to FIGS. 7 and 8. In FIGS. 7 and 8, portions identical to those of FIGS. 2 to 6B are marked with the same references and the explanation thereof will be omitted.

FIG. 7 is a plan view of the disk substrate molding die according to this embodiment. FIG. 8 is a sectional view taken along the line VIII—VIII in FIG. 7. As will be apparent from FIG. 7, this embodiment is different from the aforesaid embodiment in that position adjusting blocks 9a and 9b and position adjusting blocks 10a and 10b in this embodiment are provided so as to be laid laterally. At the same time, position adjusting bolts 11a and 11b in this embodiment can be rotated from the lateral side. In FIG. 7, the reference numeral 21 designates an L-shaped wrench.

Referring to FIGS. 7 and 8, a method of adjusting the X and Y positions of a fixed-side mirror block 3 will be described below. Let a case now be assumed that the mirror block 3 is to be moved in the left side direction in FIGS. 7 and 8.

First, a fixing bolt 12 by which the mirror block 3 is fixed is loosened from the back of a fixed side mounting plate 1.

Next, when a position adjusting bolt 11b is loosened, a position adjusting block 9b is shifted up in FIG. 8. As a result, a gap is generated between a position adjusting block 10b and the position adjusting block 9b.

When a position adjusting bolt 11a is tightened, a position adjusting block 9a is shifted down in FIG. 8, so that the position adjusting block 10a moves the mirror block 3 in the left side direction in FIG. 8 by the amount of the gap generated by the aforementioned operation.

After the quantity of movement thereof is confirmed by means of a dial depth meter, the two position adjusting bolts 11a and 11b are further tightened. The fixing bolt 12 for fixing the mirror block 3 is tightened from the back of the fixed side mounting plate 1. This adjustment is performed both in the X-direction and in the Y-direction separately.

As described above,.according to this embodiment, since the mechanism for adjusting the eccentricity of a stamper is provided in the die at the stamper mounting side to make it possible to adjust the stamper in the X- and Y-directions separately, the following advantages are obtained.

That is, the value of any eccentricity of the disk produced by this embodiment can be reduced to be equal to or less than 10 µm.

Further, the reduction of the disk eccentricity value brings the following effect to a disk driver. That is, a mechanism for causing an optical system to follow up the disk in the disk driver (player) can be simplified.

As described above, according to the present invention, the value of the eccentricity of the resulting disk can be reduced to be equal to or less than 10 µm. In addition, the tracking mechanism for causing the optical system to follow up the disk in the disk driver (player) can be simplified.

Having described preferred embodiments of the invention with reference to the accompanying drawings, it is to be understood that the invention is not limited to those precise embodiments and that various changes and modifications could be effected therein by one skilled in the art without departing from the spirit or scope of the novel concepts of the invention as defined in the appended claims.

What is claimed is:

1. A disk substrate molding die comprising: mounting means for mounting a substantially planar, thin stamper plate having a plane surface and carrying a transfer signal recorded thereon, said mounting means securing said stamper plate for adjustment substantially in an X-Y plane; and adjustment means for moving said thin stamper plate in said X-Y plane and in a direction of its plane surface, said adjustment means including a plurality of pairs of position adjusting blocks, a first pair of position adjusting blocks fixing said mounting means in said X-Y plane, a second pair of said position adjusting blocks fixing the position of said first pair of position adjusting blocks, the respective first and second pairs cooperating with each other to move along an inclined mating surface therebetween, so that movement of said first and second pairs moves said stamping plate in one of said X-Y directions.

2. A disk substrate molding die according to claim 1, wherein said adjustment means further includes a third pair of position adjusting blocks fixing said mounting means in said X-Y plane, a fourth pair of position adjusting blocks fixing the position of said first pair of position adjusting blocks, the third and fourth pair respectively cooperating with each other to move along an inclined mating surface, so that movement of said respective third and fourth pairs moves said stamping plate in the other of said X-Y directions.

3. The molding die as set forth in claim 1 further including position adjusting block bolts for adjusting each of said position adjusting blocks.

4. The molding die as set forth in claim 3 wherein said mounting means includes a mirror block.

5. The molding die as set forth in claim 4, further including a fixed side mounting plate, a mirror block spacer, a stamper plate holder for holding the stamper plate at its outer periphery, a holder for holding the stamper plate at its inner periphery, a fixing bolt, and a dial display insertion bore.

6. The molding die as set forth in claim 5, further including a fixed side embracement plate mounted on said fixed side mounting plate and a spool bush cooperating with said inner periphery stamper plate holder.

7. The molding die as set forth in claim 1 further including a disk substrate having a signal surface to which a signal has been transferred and a center bore, said disk substrate being positioned in said stamper plate holder for punching said center hole with a slight degree of eccentricity determined by said taper angle.

8. The molding die as set forth in claim 3 wherein said first, second, third and fourth position adjusting blocks are arranged to be adjusted laterally.

9. A molding die for a disk substrate, comprising:

a stamper in the form of a thin substantially planar plate carrying a transfer signal recorded thereon;

a fixing member for fixing said stamper plate;

a first pair of position adjusting blocks;

a second pair of position adjusting blocks, said first pair and said second pair of position adjusting blocks cooperating together to fix the fixing member in X- and Y-directions;

a third pair of position adjusting blocks cooperating with said first pair of position adjusting blocks;

a fourth pair of position adjusting blocks cooperating with said second pair of position adjusting blocks cooperating together with said third pair of position adjusting blocks to fix said first pair and said second pair of position adjusting blocks in said X- and Y-directions, said first and third and said second and fourth position adjusting blocks having a mating taper defining a taper angle so that a position of said fixing member is moved in the X- and Y-directions by a value corresponding to the taper angle by adjusting either or both of said second and fourth position adjusting blocks.

10. The molding die as set forth in claim 9 further including position adjusting block bolts for adjusting each of said second and fourth position adjusting blocks.

11. The molding die as set forth in claim 9 wherein said fixing member is a mirror block.

12. The molding die as set forth in claim 11, further including a fixed side mounting plate, a mirror block spacer, a holder for holding the stamper plate at its outer periphery, a holder for holding the stamper at its inner periphery, a fixing bolt, and a dial display insertion bore.

13. The molding die as set forth in claim 9, further including a fixed side embracement plate mounted on said fixed side mounting plate and a spool bush cooperating with inner periphery stamper holder.

14. The molding die as set forth in claim 9 further including a disk substrate having a signal surface to which a signal has been transferred and a center bore, said disk substrate being positioned in said stamper holder for punching said center hole with a small degree of eccentricity determined by said taper angle.

15. The molding die as set forth in claim 9 wherein said first, second, third and fourth position adjusting blocks are arranged to be adjusted laterally.

16. The molding die as set forth in claim 15 further including position adjusting bolts for said position adjusting blocks.

* * * * *